July 24, 1923.
H. KUMPUNEN
MOP HOLDER
Filed Feb. 11, 1920
1,462,794
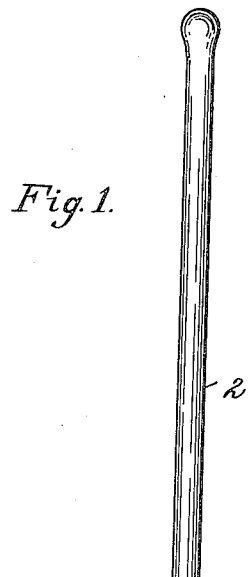
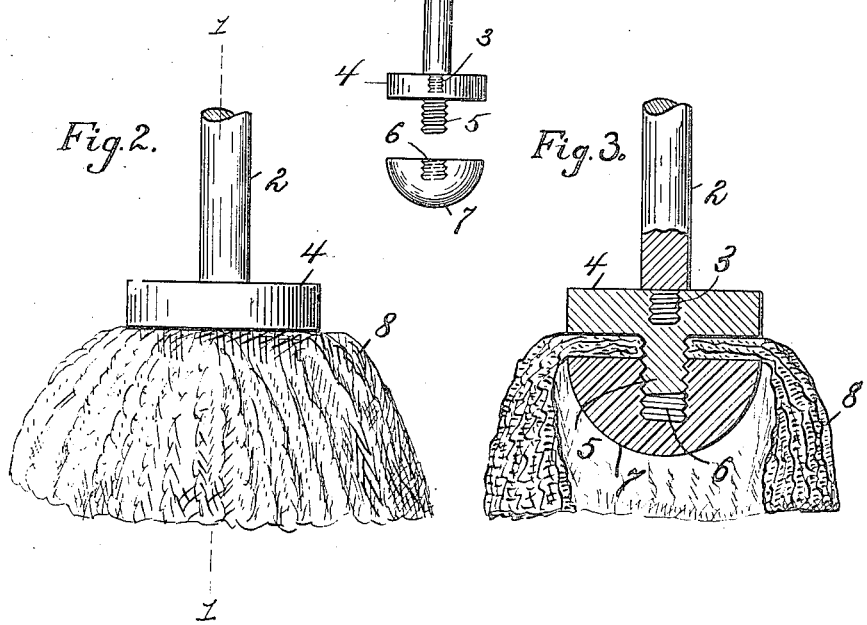
INVENTOR
Helen Kumpunen
BY Frank C. Fischer
ATTORNEY Patented July 24, 1923.

1,462,794

UNITED STATES PATENT OFFICE.

HELEN KUMPUNEN, OF RYE, NEW YORK.

MOP HOLDER.

Application filed February 11, 1920. Serial No. 357,868.

*To all whom it may concern:*

Be it known that I, HELEN KUMPUNEN, a citizen of Finland, residing in the town of Rye, county of Westchester, and State of New York, have invented certain new and useful Improvements in Mop Holders, of which the following is a full, clear, and exact description, such as will enable others skilled in the art to which it pertains to make, construct, and use the same, reference being had to the accompanying drawings, and to numerals of reference marked thereon, forming a part of this specification.

My invention is an improvement in mop holders or heads, and consists in certain novel constructions and combinations of parts hereinafter described and claimed.

The object of the invention is to provide a device of the character specified, which, while simply constructed, will be efficient, which may be cheaply manufactured, and which will be capable of standing rough usage without much injury.

In carrying out my invention, I make use of the structure illustrated in the accompanying drawings, in which—

Figure 1 represents, an elevation of the preferred form of my improved mop holder.

Figure 2 represents, an elevation of the same with the mop applied for use; and

Figure 3 represents, a longitudinal section on the line 1—1 of Figure 2.

Similar numerals of reference refer to like parts throughout the specification and drawings.

In the device illustrated in the drawings, 2 represents the handle, preferably of wood, of any desired or usual construction, one end of the same being provided with a screw threaded stud 3 designed to be received into the screw threaded aperture in one face of the disk 4.

The opposite face of the disk 4 is provided with preferably an integral screw threaded stem or stud 5 designed to have screw threaded engagement with the screw threaded aperture 6 in the butt 7.

The disk 4 is preferably made of wood, of any desired or usual construction, and of the form illustrated in the drawings.

The butt 7 is made of rubber or other similar elastic non-absorbent material, in the form of a semi-ball.

The material 8 of the mop is securely clamped between the underside of the disk 4 and the upper side of the rubber butt 7.

To release the material 8 of the mop the handle 2 is turned to loosen the screw threaded stem or stud 5 from the screw threaded aperture 6 in the semi-ball or butt 7.

The proportion of the disc with its stud enables the material 8 to be readily placed thereon and the corresponding size of the rubber butt maintains the material in its clamped and adjusted position.

The device being made from wood and rubber provides a sanitary device, in which no metal parts are employed that could become corroded or rusted together, while the rubber butt being screw threaded to the wooden stem 5 has a tendency to be securely united.

It is evident that the shape and the elastic material of which the butt 7 is made will not scratch or mar the floor, furniture or other household goods with which it may contact.

It is also evident that the simplicity of the relatively few parts and the materials of which the same are made produce a very sanitary mop and that the cloth can be readily removed and replaced or removed whenever necessary or desirable.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claim.

Having thus described my invention, what I desire to secure by Letters Patent is:—

In a device of the character described, a mop head comprising a flat wooden disk having a screw threaded centrally arranged aperture in one side thereof, and a screw threaded integral stem extending from the other side thereof, a semispherical rubber butt having a screw threaded aperture to receive the said screw threaded stem of the said disk and a wooden handle provided with an integral screw threaded stud threaded into the disk, and mop material removably and adjustably secured between the under flat side of the wooden disk and the flat upper side of the rubber butt.

This specification signed and witnessed this 8th day of January, 1920.

HELEN KUMPUNEN.

Witnesses:
S. DONALD SHERRERD,
H. C. CAMPBELL.